US009384587B2

(12) United States Patent
Davison et al.

(10) Patent No.: US 9,384,587 B2
(45) Date of Patent: Jul. 5, 2016

(54) VIRTUAL EVENT VIEWING

(75) Inventors: Jeffrey T. Davison, Hancock, NH (US); Scott D. Arena, Peabody, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 675 days.

(21) Appl. No.: 12/955,335

(22) Filed: Nov. 29, 2010

(65) Prior Publication Data

US 2012/0133638 A1 May 31, 2012

(51) Int. Cl.
*G06T 15/00* (2011.01)
*G06T 17/00* (2006.01)
*G06T 19/00* (2011.01)

(52) U.S. Cl.
CPC .............. *G06T 17/00* (2013.01); *G06T 19/00* (2013.01); *G06T 2200/08* (2013.01)

(58) Field of Classification Search
None
See application file for complete search history.

(56) References Cited

U.S. PATENT DOCUMENTS

| | | | | |
|---|---|---|---|---|
| 6,124,862 | A * | 9/2000 | Boyken et al. | 345/419 |
| 6,868,338 | B1 * | 3/2005 | Elliott | 701/469 |
| 7,787,009 | B2 * | 8/2010 | Alpaslan et al. | 348/51 |
| 8,365,075 | B2 * | 1/2013 | Bhogal et al. | 715/704 |
| 2003/0030658 | A1 * | 2/2003 | Gibbs et al. | 345/700 |
| 2005/0219375 | A1 * | 10/2005 | Hasegawa et al. | 348/211.2 |
| 2006/0281552 | A1 * | 12/2006 | Bulusu | 463/41 |
| 2007/0061487 | A1 * | 3/2007 | Moore et al. | 709/246 |
| 2007/0156664 | A1 * | 7/2007 | Norton et al. | 707/3 |
| 2008/0032797 | A1 * | 2/2008 | Harris et al. | 463/40 |
| 2008/0126943 | A1 * | 5/2008 | Parasnis et al. | 715/730 |
| 2008/0158373 | A1 * | 7/2008 | Chu | 348/211.14 |
| 2008/0170123 | A1 * | 7/2008 | Albertson et al. | 348/157 |
| 2008/0180438 | A1 * | 7/2008 | Sasaki et al. | 345/420 |
| 2008/0292140 | A1 * | 11/2008 | Morris et al. | 382/103 |
| 2008/0309675 | A1 * | 12/2008 | Fleury | G06T 17/00 345/581 |
| 2009/0037822 | A1 * | 2/2009 | Kandekar et al. | 715/733 |
| 2009/0063283 | A1 * | 3/2009 | Kusumoto et al. | 705/14 |
| 2009/0131177 | A1 * | 5/2009 | Pearce | 463/43 |
| 2009/0171806 | A1 * | 7/2009 | Klinger et al. | 705/26 |
| 2009/0262194 | A1 * | 10/2009 | Wakefield et al. | 348/157 |
| 2009/0317052 | A1 * | 12/2009 | Sezan et al. | 386/52 |
| 2009/0322489 | A1 * | 12/2009 | Jones et al. | 340/10.3 |
| 2010/0110169 | A1 * | 5/2010 | Zerkin | 348/77 |
| 2010/0161906 | A1 * | 6/2010 | Bolger et al. | 711/137 |
| 2010/0304931 | A1 * | 12/2010 | Stumpf | 482/4 |
| 2010/0321389 | A1 * | 12/2010 | Gay et al. | 345/427 |
| 2011/0082008 | A1 * | 4/2011 | Cheung et al. | 482/8 |
| 2011/0193958 | A1 * | 8/2011 | Martin et al. | 348/143 |
| 2012/0050529 | A1 * | 3/2012 | Bentley | 348/139 |

* cited by examiner

*Primary Examiner* — Anh-Tuan V Nguyen

(57) ABSTRACT

A method may include receiving a number of video feeds for a live event from video capture devices located at an event venue. A three-dimensional model of the event may be generated based on received video feeds. A request to view a virtual event corresponding to the live event may be received from a user device. The 3D model may be forwarded to the user device. A virtual representation of the event may be output based on the 3D model. A request may be received to manipulate a view within the virtual representation. A modified virtual representation of the event may be output based on the request.

20 Claims, 8 Drawing Sheets

VIRTUAL EVENT VIEWING

BACKGROUND INFORMATION

Historically, content customers typically only consumed professionally-produced media programs (e.g., network television programs, educational programs, etc.). These types of content and content consumption were popularized by large networks (e.g., NBC, CBS, and ABC) and the technology of the time (e.g., broadcast television and radio). Unfortunately, in many instances, even where the program content is desirable for viewing by users, the production of the content is not sufficiently tailored to the users' interests.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Implementations described herein relate to devices, methods, and systems for presenting and interacting with virtual events. Consistent with embodiments described herein, an event may be captured by a number of video capture devices, from a number of different angles or perspectives. The event may include a sporting event, an entertainment event, or a political event. A virtual, three dimensional (3D) representation of the event may be generated based on the captured feeds. In one implementation, the virtual 3D representation may be presented to viewers in a manner that enables the viewers to view the event from any desired vantage point.

In other implementations, the virtual 3D representation of the event may be mapped into other 3D virtual environments, such a role playing game environment. In this implementation, character or thematic appearance information may be mapped onto the virtual 3D representation of the event, thereby tailoring the virtual 3D representation of the event to the desires of the viewer.

Figure 1:
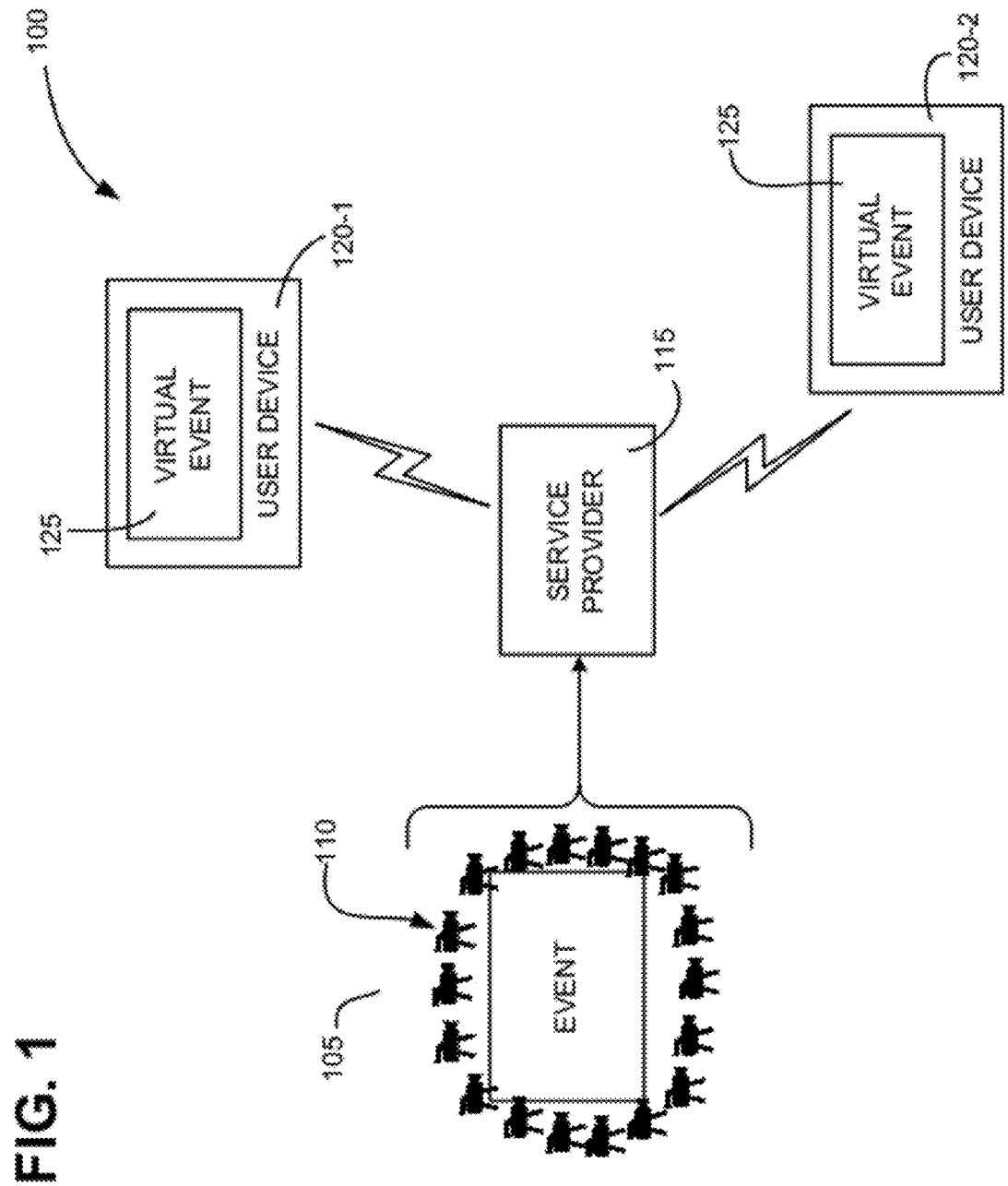
FIG. 1 is a diagram of an overview of an exemplary embodiment for providing virtual event viewing.

FIG. 1 is a block diagram depicting an overview 100 of the concepts described herein. As shown, a venue 105 may include a number of cameras or other information capture devices 110 positioned throughout venue 105 for capturing visual and/or audio-visual information associated with an event, such as a live athletic event. In some implementations, capture devices 110 may include a number of high definition (HD) or three dimension (3D) television cameras. In some implementations, one or more of capture devices 110 may be configured to capture audio commentary associated with the live athletic event.

Capture devices 110 may generate feeds corresponding to the captured information. These feeds may be forwarded or transmitted to a service provider 115, such as a broadcaster, cable company, satellite television company, etc. For example, the feeds may be uplinked to a satellite via one or more mobile production units, transmitted via terrestrial cables, etc. In other implementations, data from capture devices 110 may be merged or collected prior to transmission to service provider 115.

Consistent with implementations described herein, service provider 115 may generate a virtual 3D representation or model of the event based on the received feed data. For example, motion capture techniques may be applied to received visual data in the feed data. In some implementations, participants (e.g., athletes, actors, etc.) or venue elements (e.g., a ball field, the ball, lines on the field, props, etc.) in venue 105 may be outfitted with motion capture assisting elements, such as distinct elements affixed to the participants' apparel or to venue elements.

The 3D representation may be distributed to user devices 120-1 and 120-2 for presentation as a virtual event 125. The virtual 3D representation of the event may be distributed via a number of different distribution mechanisms, such as cable television systems, over the air (OTA) broadcast, fiber optic television systems, satellite television systems, etc. In some implementations, the virtual 3D representation may be transmitted to third party licensees, such as game providers (e.g., massively multiplayer online game (MMOG) provider). In this implementation, the third party licensee may insert the virtual 3D representation into an existing virtual environment. In still another implementation, the third party licensee may modify an appearance of the virtual 3D representation, so as to make the virtual event appear differently, yet play out in a manner consistent with the live event.

User devices 120-1 and 120-2 may be configured to receive the virtual 3D representation and enable a user to interact with virtual event 125. For example, the user may interact with virtual event 125 to position a virtual camera at a desired location or vantage point within virtual event 125. In other implementations, user devices 120-1 and 120-2 may enable a user to select or follow a particular element (e.g., ball, goal, etc.) or participant (e.g., favorite player, actor, etc.) throughout the virtual event. Additionally, the user may be enabled to view the element or participant from any virtual angle or perspective.

Figure 2:
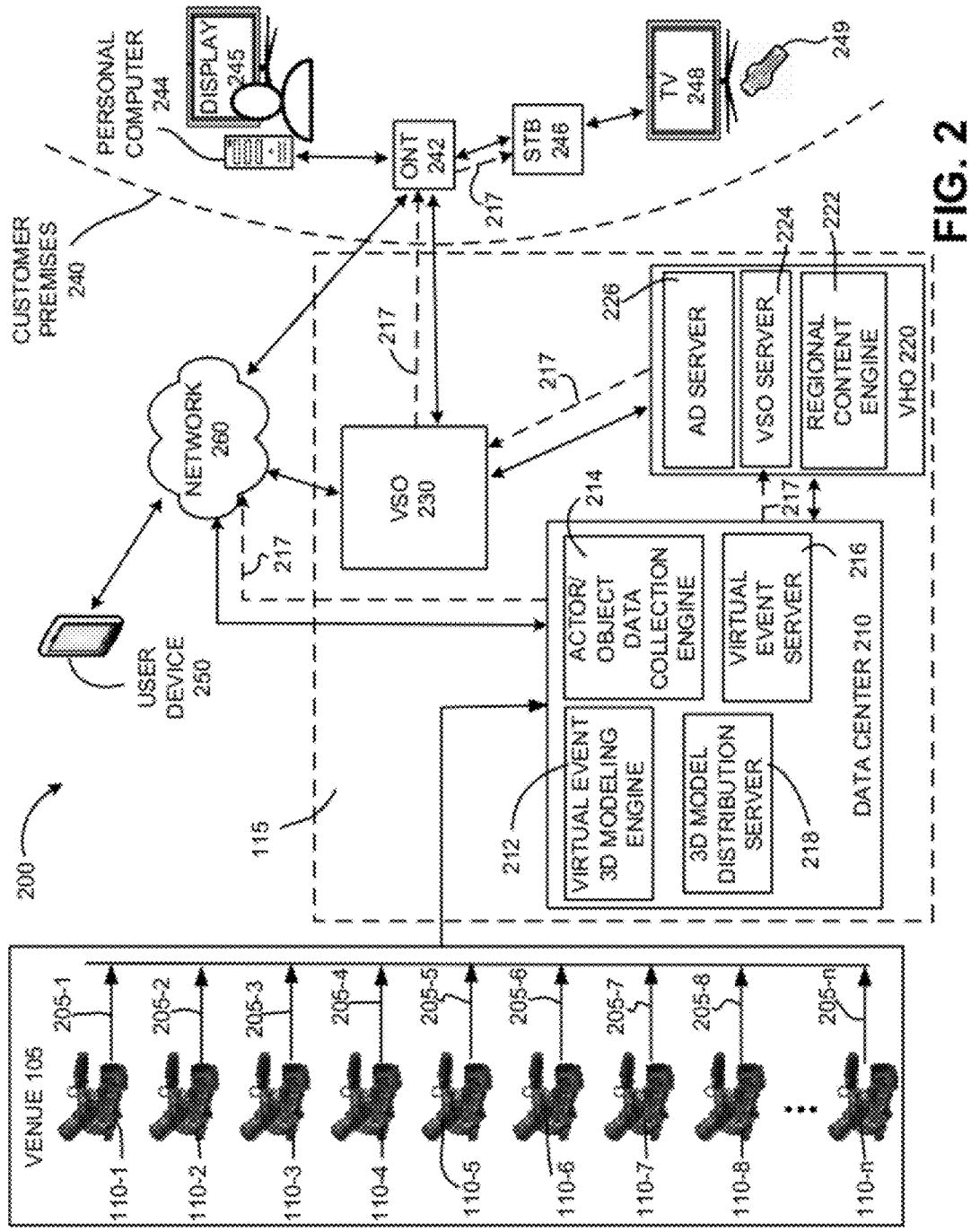
FIG. 2 is a diagram of an exemplary network 200 for implementing the embodiment of FIG. 1 and other embodiments.

FIG. 2 is a diagram of an exemplary network 200 for implementing the embodiment of FIG. 1 and other embodiments. Network 200 may include venue 105, video capture devices 110-1 to 110-n, a data center 210, a video hub office (VHO) 220, a video service office (VSO) 230, customer premises 240, user device 250, and a network 260.

As described briefly above, venue 105 may include any setting or location in which multiple video feeds of the same event or occurrence are being captured simultaneously by video capture devices 110. For example, venue 105 may include a sports stadium or arena, theater, movie/television set, newsroom, etc. Venue 105 may further include facilities for collecting and transmitting the video feeds from video capture devices 110 to data center 210 for eventual distribution to customer premises 240 and/or user device 250. As described above, in some implementations, the facilities for collecting the video feeds may include motion capture data extraction capabilities for extracting motion capture information from the capture video feeds. Such facilities may include mobile production units, broadcast/uplink facilities, radio frequency broadcast facilities, etc.

In some implementations, the video feeds may be transmitted to data center 210 via wireless network, such as a cellular data network (e.g., an EV-DO (EVolution-Data Optimized) network, LTE (Long Term Evolution), or HSDPA (High-Speed Downlink Packet Access) network). In other implementations, satellite-based transmission may be used to transmit broadcast quality video feeds from venue 105 to data center 210.

Video capture devices 110 may include devices capable of capturing and transmitting video feeds 205-1 to 205-n (collectively, "video feeds 205" and individually, "video feed 205"). Suitable video capture devices 110 may include television cameras, movie cameras, etc. In other implementations, single-purpose motion capture devices may be used as video capture devices 110. Consistent with implementations described herein, individual video feeds 205 from each video capture device 110 may be transmitted (e.g., individually or collectively) in some manner to data center 210 for use in generating a virtual 3D version of the event.

Customer premises 240 (e.g., a customer's home or business) may include an optical network terminal (ONT) 242, a personal computer 244, a set-top box (STB) 246, a television 248, and a remote control 249. ONT 242 may receive data, e.g., on a fiber optic cable, and may transfer the data to the appropriate device in customer premises 240, such as computer 244 or STB 246. Likewise, ONT 242 may receive data from any device in customer premises 240 and may transmit the data to other devices in network 200, e.g., through a fiber optic cable. ONT 242 may provide customer premises 240 with Internet access, television access, or telephone service, for example.

Computer 244 may include a laptop, a desktop, a tablet computer, a mobile telephone, a personal digital assistant (PDA), or another computation and/or communication device. Computer 244 may include a microphone for capturing audio and/or a camera for capturing images or video. Computer 244 may also include a display 245 for showing images or video or a speaker for playing audio. Computer 244 may connect to network 260 (e.g., the Internet) through ONT 242 and VSO 230, for example. As described below, computer 244 may allow a user to interact with one or more applications (e.g., a virtual event application, a MMOG environment, etc.).

STB 246 may receive content and output the content to TV 248 for display. STB 246 may include a component (e.g., a cable card or a software application) that interfaces with (e.g., plugs into) a host device (e.g., computer 244, TV 248, a stereo system, etc.) and allows the host device to display content. STB 246 may also be implemented as a home theater personal computer (HTPC), an optical disk player (e.g., digital video disk (DVD) or Blu-Ray™ disc player), a gaming system (e.g., an XBOX, Playstation, or Wii system), etc. STB 246 may receive commands or data from other devices in network 200, such as remote control 249, and may transmit data to other devices in network 200 (e.g., to data center 210).

TV 248 may output content received from STB 246. TV 248 may include speakers as well as a display. Remote control 249 may issue wired or wireless commands for controlling other electronic devices, such as TV 248 or STB 246. Remote control 249, in conjunction with STB 246, may allow a user to interact with an application (e.g., a virtual event application) running on STB 246. Other types of devices (e.g., a keyboard, a mouse, mobile phone, etc.) may be used instead of remote control 249. In one embodiment, TV 248 and/or STB 246 may be associated with a camera and a microphone for capturing user-generated clips or content, such as voice-over audio, etc.

As described below, STB 246 may be configured to receive information and/or data relating to a virtual event model created or generated at data center 210 based on video feeds 205. In addition, STB 246 may receive updated or streamed information relating to the virtual event model from data center 210 to reflect a live event captured by capture devices 110. STB 246 may also receive, from the user, such as via remote control 249, for example, instructions to interact with a virtual event generated based on the virtual event model.

User device 250 may include a mobile device, such as a mobile phone, a smart phone (e.g., a smart phone with a high definition display), a laptop or notebook computer, a personal computer, a tablet device, etc. configured to access VSO 230 and/or data center 210 via network 260. For example, user device 250 may be configured to access VSO 230 or data center 210 via the Internet, without initially passing though ONT 242 or customer premises devices. Devices in customer premises 240 (e.g., computer 244, STB, 246, and TV 248) may also be considered "user devices 250" for the purposes of this description.

Customer premises 240 and user device 250 may connect to VSO 230. VSO 230 may deliver content to customer premises 240 and may receive data from customer premises 240 for forwarding to the proper destination (e.g., VHO 220, data center 210, or any device in network 200). VSO 230 may include a content server for transcoding and multiplexing content from different sources for delivery to customer premises 240, such as a virtual event model from VHO 220. In addition to the virtual event model information, VSO 230 may be configured to provide information relating to the content associated with the model, such as actor or participant information, statistical information, Internet source information, etc. This information may be transmitted to and/or retrieved from data center 210. VSO 230, VHO 220, data center 210, and other devices in network 200 may form part of a high-speed fiber optic network (e.g., FiOS™) In one implementation, the high-speed fiber optic network may operate at per-premises speeds on the order of 1-10 gigabits per second (GiP).

Each VHO 220 (one of which is shown in FIG. 2 for simplicity) may include a regional content engine 222, a VSO server 224, and an Ad server 226. Regional content engine 222 may receive and format regional television content (e.g., local broadcast stations, community access stations, etc.) for distribution to the VSO facilities 230 operating under each VHO 220. VSO server 224 may provide the national television content (e.g., from a super head end (not shown)), and regional television content (e.g., from regional content/ad engine 222) to VSO 230, for subsequent delivery to customer premises 240 and/or user device 250.

Ad server 226 may be configured to provide advertisements to user devices 250 during selection and display of virtual events received from virtual event server 216. In one implementation, different advertisements may be inserted based on the type of virtual event (e.g., sporting event, performance, etc.). For example, billboards, placards, or other elements in venue 105 shown in the virtual event may be modified to display advertisements or advertising information served by ad server 226.

Network 260 may include one or more packet switched networks, such as an Internet protocol (IP) based network, a local area network (LAN), a wide area network (WAN), a personal area network (PAN), an intranet, the Internet, a cellular network (e.g., an EV-DO network, LTE network, or HSDPA network), a fiber-optic network, or another type of network that is capable of transmitting data. Network 260 may include a circuit-switched network, such as a public-switched telephone network (PSTN) for providing telephone services for traditional telephones. Network 260, in conjunction with components in VSO 230, may allow devices at customer premises 240 (e.g., a computer or a set-top box) to connect to other devices also attached to network 240, such as third party web-site servers (not shown) or other customers (not shown), or user device 250.

Consistent with implementations described herein, VSO 230 may transmit a virtual event model from data center 210 to user devices 250. For example, STB 246 may be configured to include a virtual event viewing application configured to receive the model information from data center 210 (via VHO 220 and VSO 230).

Data center 210 may include one or more servers or other network devices (collectively, "network devices") that process, manage, distribute, and/or store data associated with information received from video capture devices 110. In some implementations, data center 210 may be associated with VHO 220, such that multiple data centers 210 may be associated with multiple regional VHOs 220. In other implementations, a single data center 210 may service or provide information to more than one VHO 220.

As shown in FIG. 2, data center 210 may include a virtual event 3D modeling engine 212, an actor/object data collection engine 214, a virtual event server 216, and a 3D model distribution server 218. Devices in data center 210 may include one or more computers for hosting programs, such as a model generating application, a web server (e.g., Apache), a database (e.g., MySQL), or other applications.

Virtual event 3D modeling engine 212 may include one or more systems or devices for receiving video feeds 205 and related information from venue 105. For example, motion capture techniques may be applied to received visual data in video feed 205. In some implementations, participants (e.g., athletes, actors, etc.) or venue elements (e.g., a ball field, the ball, lines on the field, props, etc.) in venue 105 (collectively referred to as "event elements") may be outfitted with motion capture assisting elements (e.g., "markers"), such as distinct elements affixed to the participants' apparel or to venue elements. Information regarding the identity of the event elements may be transmitted to data center 210 with video feeds 205. For example, particular motion capture markers may be associated with particular event elements, thereby allowing tracking of the markers to track the corresponding event elements. In other implementations, non-visual markers, such as RFID (radio frequency identification) tags may be associated with the event elements. Information relating to the location of the RFIDs may be transmitted to data center 210 along with the video feeds 205, thereby allowing visual information in the feeds to be associated with known individuals or elements in the virtual event model. In other implementations, virtual event 3D modeling engine may perform optical character recognition (OCR) in participants/elements in video feeds 205, such as names/numbers of athletes, etc.

As described above, video capture devices 110 may be positioned at known locations within venue 105, as defined by relative angles, elevations, distances, etc. Using the visual information in video feeds 205 and the additional related information, virtual event 3D modeling engine 212 may be configured to generate a 3D model of the event. The 3D model may include 3D representations of venue 105 and the participants or actors in the event. For a live event, such as a sporting event, video feeds 205 and related information may be received as a stream of data from venue 105. As the data stream is received by data center 210, virtual event 3D modeling engine 212 may update the 3D model of the event, based on the action occurring in the live event and reflected in the received video feeds 205.

Consistent with implementations described herein, the 3D model of the event may include event information relating to venue 105, and various event elements, such as participants, objects, etc. This information may be generally referred to as model metadata. Inclusion of model metadata allows selection of and navigation based on element identifiers, such as player names, numbers, ball location, venue location, etc.

Actor/object data collection engine 214 may include one or more systems or devices for retrieving information relating to model metadata received from venue 105 or generated by virtual event 3D modeling engine 212. For example, actor/object data collection engine 214 may be configured to collect information about event participants (e.g., players, teams, speakers, actors, etc.) from network 260 (e.g., the Internet). In some implementations, additional information may be collected, such as information relating to a league or conference associated with the event, etc. The collected information may be stored in a database or other memory structure for transmission to VHO 220 (and to STB 246/user devices 250) in relation to the event model. As described below, users may interact with a rendered virtual event and may select to view information relating to the event or the participants in the event. This information may be retrieved from actor/object data collection engine 214 and delivered to the user.

Virtual event server 216 may include one or more devices for forwarding a generated event model 217 to VHO 220, for delivery to STB 246/user devices 250. For example, virtual event server 216 may be configured to automatically and/or periodically transmit event model 217 to VHO 220 upon generation or updating by virtual event 3D modeling engine 212. In other implementations, virtual event model 217 may be transmitted as a stream of information, with the contents of the stream being updated based on the feed information received by virtual event 3D modeling engine 212. In some implementations, virtual event server 216 may include a web server or other device for providing virtual event model 217 to a client device, such as a web browser. In some cases, virtual event server 216 may comprise and application server for providing a virtual event viewing application to such client devices.

3D model distribution server 218, similar to virtual event server 216, may be configured to forward event model 217 upon request. However, unlike virtual event server 216, 3D model distribution server 218 may be configured to forward event model 217 to VHO 220 upon completion of the live event. In addition, 3D model distribution server 218 may be configured to distribute virtual event model 217 to other entities, such as third party licensees of the model. As described above, such third party distribution may include distribution of virtual event model 217 for instructional uses, gaming uses, novelty purposes, etc. In some implementations, virtual event model 217 may be distributed to third party entities via network 260 (e.g., the Internet, a private network, etc.).

The exemplary configuration of devices in network 200 is illustrated for simplicity. Network 200 may include more devices, fewer devices, or a different configuration of devices than illustrated in FIG. 2. For example, network 200 may include thousands or millions of customer premises. As another example, network 200 may include a cable modem in a customer premises for receiving and transmitting data from a central office. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
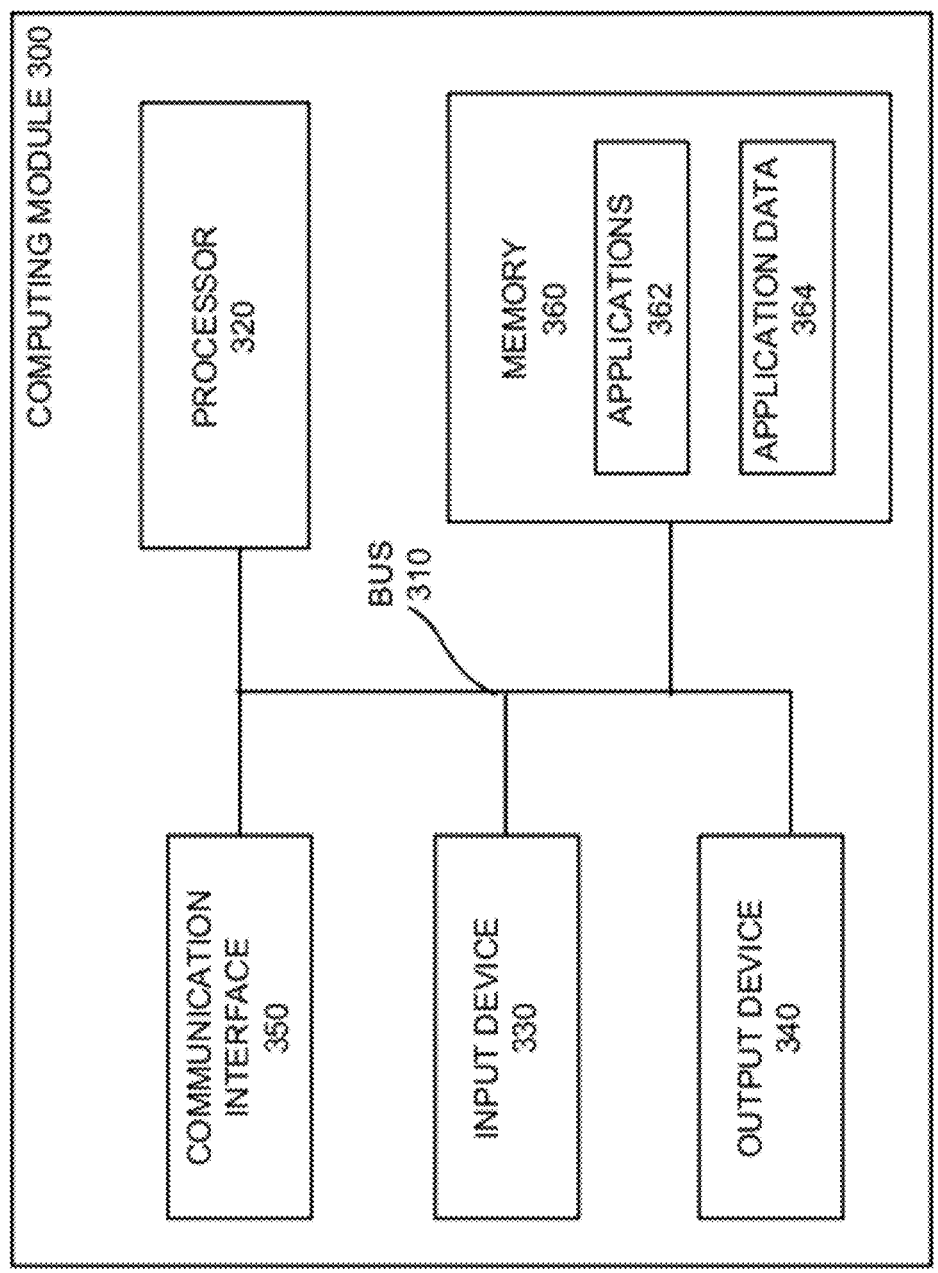
FIG. 3 is a block diagram of exemplary components of a computing module.

Devices in network 200 may each include one or more computing modules. FIG. 3 is a block diagram of exemplary components of a computing module 300. Computing module 300 may include a bus 310, processor 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processor 320 may include any type of processor or microprocessor (or families of processors or microprocessors) that interprets and executes instructions. In other embodiments, processor 320 may include an application-specific integrated circuit (ASIC), a field-programmable gate array (FPGA), etc.

Input device 330 may allow a user to input information into computing module 300. Input device 330 may include a keyboard, a mouse, a pen, a microphone, a remote control (e.g., remote control 249), an audio capture device, an image and/or video capture device, a touch-screen display, etc. Some devices, such as servers 212, 214, 216, 222, and 224 may be managed remotely and may not include input device 330. In other words, some devices may be "headless" and may not include a keyboard, for example.

Output device 340 may output information to the user. Output device 340 may include a display, a printer, a speaker, etc. For example, TV 248, personal computer 244, and/or display 245 include a display (an output device), which may include a liquid-crystal display (LCD) for displaying content to the user. As another example, ONT 242 and STB 246 may include light-emitting diodes (LEDs). Headless devices, such as servers 212, 214, 216, 222, and 224 may be managed remotely and may not include output device 340.

Input device 330 and output device 340 may allow a user to activate and interact with a particular service or application, such as an interactive event viewing application, an interactive program guide (IPG), a digital video recorder (DVR), a web browser, or a video editing program. Input device 330 and output device 340 may allow a user to receive and view a number of options or features and select from the options. The options or features may allow the user to select various functions or services associated with applications executed by computing module 300.

Communication interface 350 may include a transceiver that enables computing module 300 to communicate with other devices or systems. Communication interface 350 may include a transmitter that converts baseband signals to radio frequency (RF) signals or a receiver that converts RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, a radio-frequency identification (RFID) interface, a near-field communications (NFC) wireless interface, etc.

Memory 360 may store, among other things, information and instructions (e.g., applications 362) and data (e.g., application data 364) for use by processor 320. Memory 360 may include a random access memory (RAM) or another type of dynamic storage device, a read-only memory (ROM) device or another type of static storage device, and/or some other type of magnetic or optical recording medium and its corresponding drive (e.g., a hard disk drive). Applications 362 and application data 364 may provide network services or include applications, depending on the device in which the particular computing module 300 is found.

Computing module 300 may perform the operations described herein in response to processor 320 executing software instructions contained in a computer-readable medium, such as memory 360. A computer-readable medium may include a physical or logical memory device. The software instructions may be read into memory 360 from another computer-readable medium or from another device via communication interface 350. The software instructions contained in memory 360 may cause processor 320 to perform processes that are described herein.

Figure 4:
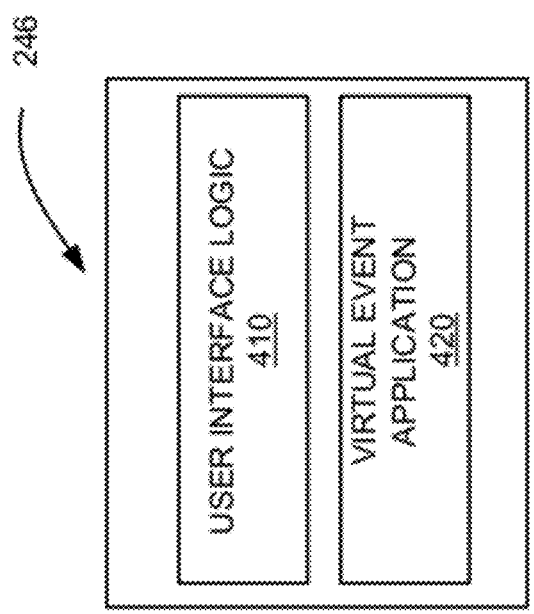
FIG. 4 is a block diagram of exemplary components of the of the STB of FIG. 2.

As described above, service provider 115 may provide 3D virtual event viewing services to a user. For example, STB 246/computer 244 may allow a user to interact with virtual event server 216 to select, view, and interact with one or more virtual events corresponding to virtual event models 217 stored by virtual event server 216. FIG. 4 is a block diagram of an exemplary component of STB 246 (e.g., functions performed by application 362 in processor 320 or stored in memory 360 of STB 246). STB 426 may include user interface logic 410, and a virtual event application 420. Computer 244, TV 248, and or user device 250 may be similarly configured and may also allow a user to interact with virtual event server 216 to select and view/interact with one or more virtual events.

User interface logic 410 may include logic configured to receive instructions from a user relating to activating virtual event application 420, navigating between and/or selecting from a number of available virtual events, interacting with a selected virtual event (e.g., moving within the virtual event, etc.), and selecting event elements for viewing additional information. Selected portions of this information may be transmitted to data center 210 for use in receiving a virtual event model (e.g., as a stream or as a completed event model).

In some implementations, user interface logic 410 may be included in an interactive media guide (IMG) application executing on STB 246. For example, such an IMG application may provide a graphical interface for selecting and viewing a number of options available from service provider 115, such as broadcast television content, recorded television content, pay-per-view and on-demand content, games, widgets, etc. Consistent with implementations described herein, the IMG application may include a virtual event option for providing users with an interface for selecting and viewing 3D event models. In some embodiments, the virtual event option may be provided in conjunction with live or recorded display of the corresponding event, while in other embodiments, the virtual event option may be a stand-alone option in the IMG application.

Virtual event application 420 may include a combination of software and/or hardware components for receiving interface information from user interface logic 410 regarding user selection of a virtual event option (e.g., in an IMG application) and presenting interactive virtual events to the user. More specifically, virtual event application 420 may be configured to graphically present an immersive 3D virtual environment to the user by rendering a selected view based on user requests and received virtual event model information.

For example, virtual event application 420 may be configured to, upon activation or execution on STB 246 (e.g., upon selection from a number of available applications or viewing options), present a graphical user interface (GUI) for display via TV 248. The GUI may include a representation of at least one virtual event model 217 available for selection by the user. In one implementation, virtual event application 420 may receive a user request to view a particular virtual event, may forward the request to virtual event server 216 and may receive virtual event model 217 in response to the request. As described below, the virtual event application GUI may enable users to immersively navigate within the virtual events generated based on the received virtual event model 217.

Consistent with one implementation, virtual event application 420 may enable users to store or record selected portions of a virtual event model. For example, a user may navigate within a virtual model to demonstrate a portion of the virtual event. The user may save a portion (e.g., the selected view of the portion of the model) and may share the saved portion for later viewing by themselves or others. As an example, assume that the virtual event is a football game and the saved portion is a view of a particular play in the game viewed from a position corresponding to the running back's eyes. The saved portion of the virtual event may be used to demonstrate what the running back may have seen (or should have seen) and may be used to educate a team, for example.

Although depicted in FIG. 4 as executing on STB 246, in some implementations, virtual event application 420 may be executed on other devices, such as computer 244 or user device 250. In such instances, users may be provided with access to virtual events on a number of different platforms. For example, user interface logic 410 and virtual event application 420 may be executed in conjunction with a web browser application on computer 144 or user device 250.

Figure 5A:
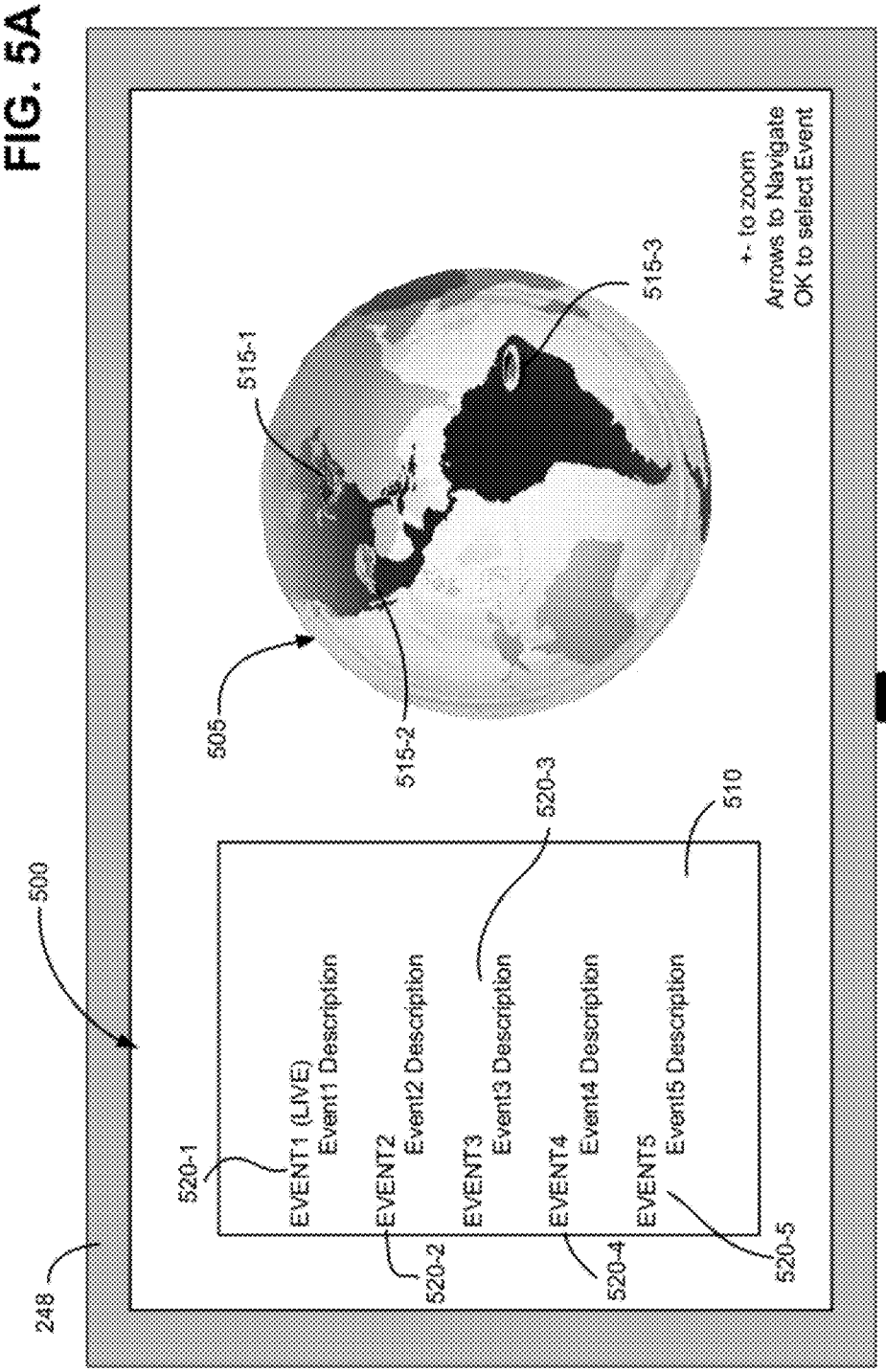
FIGS. 5A-5C illustrate exemplary graphical user interfaces for providing virtual event viewing consistent with implementations described herein.

FIG. 5A illustrates one exemplary implementation of an interface for providing virtual events to a user. As shown, FIG. 5A illustrates a GUI 500 that includes a graphical representation of a 3D environment 505 and a listing of available virtual events 510. As shown, graphical representation 505 may include a representation of a globe. However, other, more narrow, environments may be depicted, such as maps, buildings in which a variety of events are being offered, etc. Available virtual events 217 may be graphically presented on environment 505 as graphical icons 515 (three of which are shown in FIG. 5A as icons 515-1, 515-2, and 515-3). Graphical icons 515 may be presented in locations on environment 505 corresponding to the physical location of the live event. For example, a virtual event for a football game between the New England Patriots and the Pittsburgh Steelers may be represented by an icon (515-1) of Gillette Stadium in an area corresponding to Boston, Massachusetts. Other icons may be used to graphically represent other events, such as a football game at New Texas Stadium in Dallas, Tex. (icon 515-2), and a soccer match at Maracanã Soccer Stadium in Rio de Janeiro, Brazil (icon 515-3).

Users may navigate environment 505 via user interface logic 410, such as via remote control 249, or via other input devices (e.g., a keyboard for computer 244, a keypad or touch screen on user device 250, etc.). Consistent with implementations described herein, navigation of environment 505 may cause environment 505 to be manipulated as a 3D environment.

In addition to graphical environment 505 and icons 515, GUI 500 may also (or alternatively) include listing of available virtual events 510. Each event 520 listed in listing 510 may include a name, a description, etc. As shown listing 510 includes five events 520-1 to 520-5 (identified as Event1 to Event5, respectively in FIG. 5A). Users may navigate environment listing 510 via user interface logic 410, such as via remote control 249, or via other input devices to view or select a particular event 520.

Figure 5B:
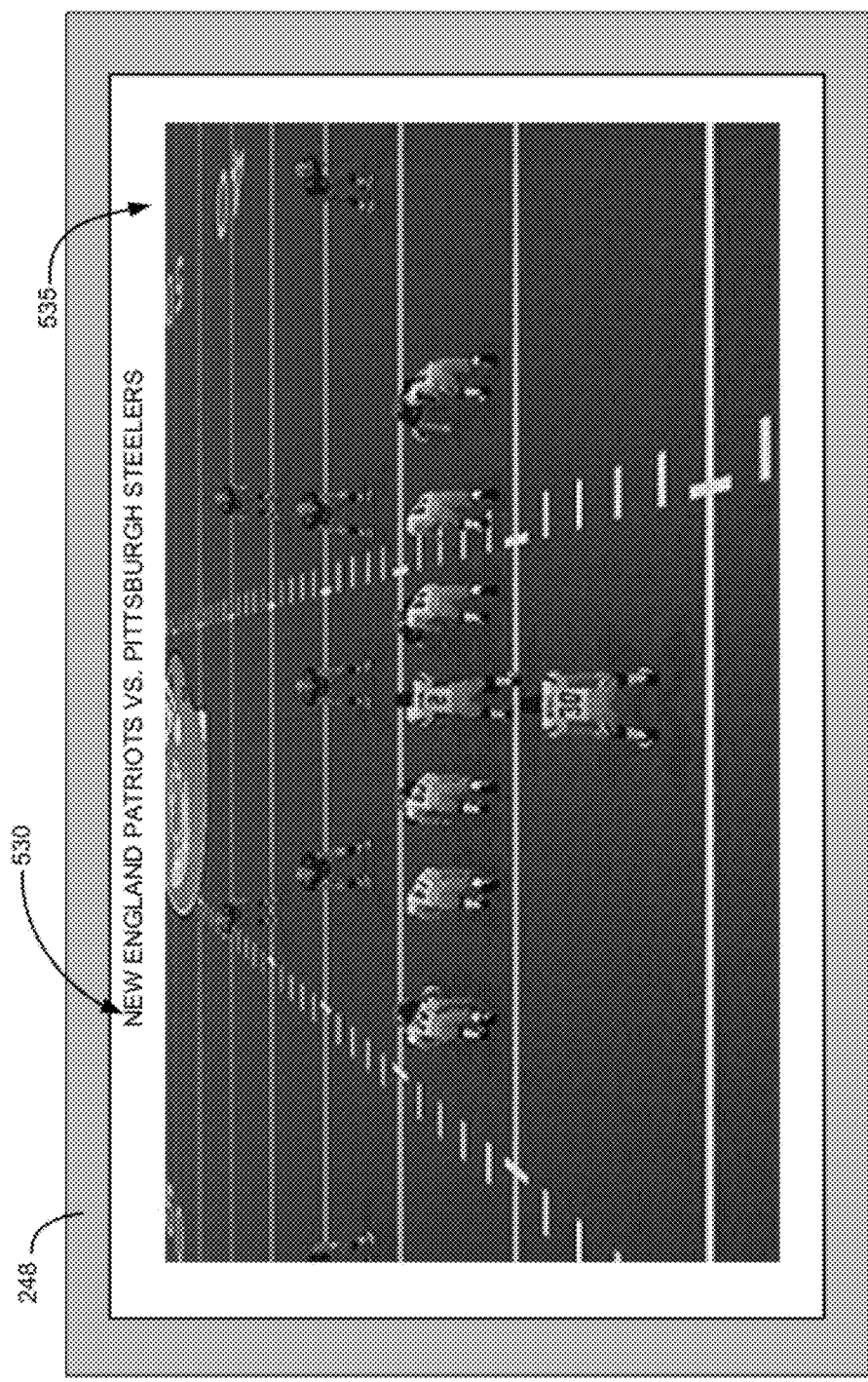
Figure 5B:
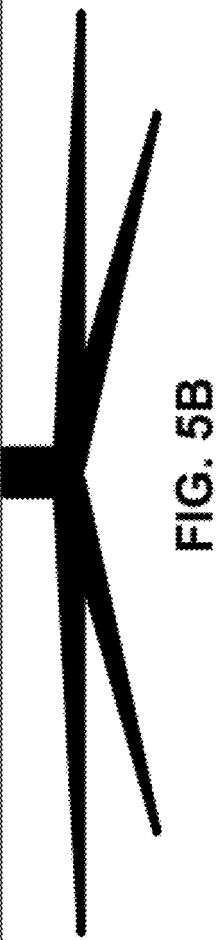

Consistent with implementations described herein, GUI 500 may facilitate user interaction and selection of a particular virtual event (e.g., via listing 510 or graphical environment 505). For example, the user may navigate GUI 500 using remote 249 to select event 520-1 from listing 510. FIG. 5B illustrates a GUI 530 following user selection of a particular virtual event 520-1 from listing 510.

As described above, in response to the selection of a particular virtual event, virtual event application 420 may request and receive a virtual event model 217 corresponding to the selected event from virtual event server 216. As shown, upon selection of virtual event 520-1, a 3D representation 535 of the virtual event may be shown that is based on the virtual event model 217 received from virtual event server 216. GUI 530 may facilitate user interaction with the 3D representation 535. For example, a user may navigate 3D representation 535 to place a virtual camera or point of view with the virtual event.

In some implementations, elements/participants in 3D representation 535 may be selectable for viewing additional information and/or element/participant-based views. For example, a ball in a football or soccer game may be selected by the user and "followed" to ensure that the view of the event shown in GUI 530 always contains the ball. Similarly, players or actors may be selected and followed. In some implementations, users may navigate between elements/participants using an input device, such as remote control 249, a mouse, a touch screen, etc. As described above, virtual event model 217 generated by virtual event 3D modeling engine 212 may include additional information or metadata corresponding to elements within the model. This information is provided in model 217 for use by virtual event application 420 in providing a particular virtual event or a particular view 535 of the virtual event to the user.

Although not shown in FIG. 5B, 3D representation 535 may include playback controls for allowing the user to pause, rewind, and (in some instances) fast forward through a provided virtual event. For example, where the virtual event is provided in a substantially synchronized manner with the original live event, the user may pause or rewind the virtual event and may fast forward up until they are caught up with the live action. In this manner, virtual event application 420 may store model 217 in a manner similar to a recorded television program using a DVR aspect of STB 246/computer 244. In embodiments in which the virtual event is provided following completion of the live event, the playback controls may allow unlimited movement in time through model 217.

Figure 5C:
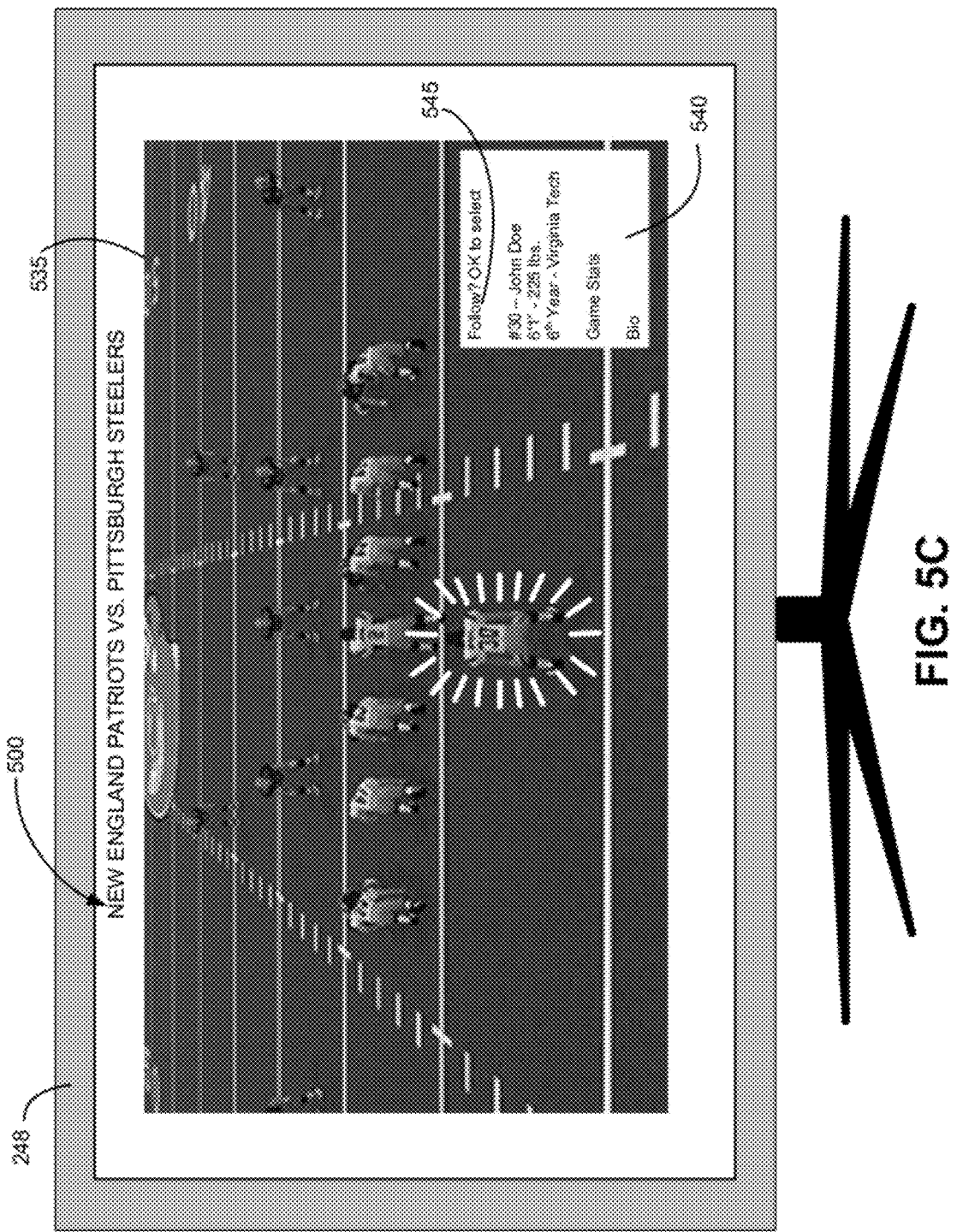

FIG. 5C illustrates GUI 530 following user selection of a particular virtual event element/participant. As shown, GUI 530 includes an information pop-up 540 generated upon user selection of player #30 in representation 535. Information pop-up 540 may include information received with virtual event model 217 from virtual event server 216. As described above, this information may include information retrieved by actor/object data collection engine 214 during model generation. In other implementations, the received information regarding a selected element/participant (e.g., player name, number, team, etc.) may be used as the basis for a real-time search of third party information, such as third party websites, etc. Retrieved information may be presented in information pop-up 540 for user review and may be updated periodically. Additionally, an indication of the selected element/participant may be provided in 3D representation 535, such as by highlighting the selected element or participant.

In addition, as shown in FIG. 5C, information pop-up 540 may include a follow option 545. As briefly described above, user selection of follow option 545 may cause virtual event application 420 to output 3D representation 535 that includes the selected or "followed" element or participant.

Figure 6:
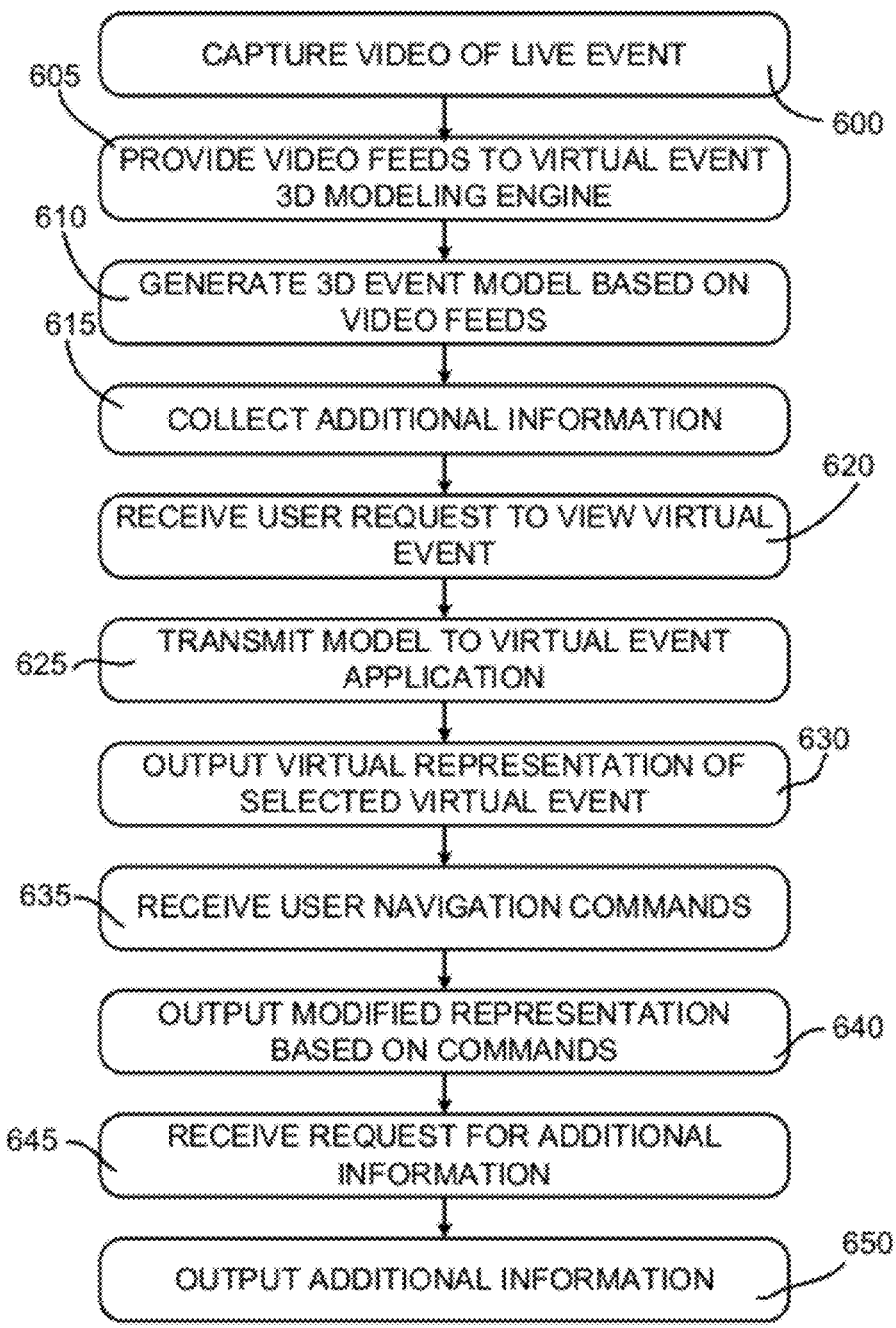
FIG. 6 is a flow diagram illustrating exemplary processing associated with providing a virtual event viewing experience to a user.

FIG. 6 is a flow diagram illustrating exemplary processing associated with providing a virtual event viewing experience to a user. Processing may begin with video capture devices 110 capturing video associated with a live event (block 600). For example, as described above, a number of video capture devices 110 may be provided that capture the live event from a number of angles/perspectives. Outputs from the video capture devices 110 may be provided to virtual event 3D modeling engine as video feeds 205 (block 605). In addition, as described above, event element and participant identification information may be provided to virtual event 3D modeling engine 212 in addition to the video information. This information may be used by virtual event 3D modeling engine to associate elements of a generated event model with particular objects, actors, and participants, for providing this identification information (and other information) to requesting users. In addition, each video feed 205 may include feed information, such as angle, location, name, etc.

Virtual event 3D modeling engine 212 may generate a 3D model based on the received video feeds 205 and feed/event information (block 610). For example, in one implementation, virtual event 3D modeling engine 212 may generate a real-time model contemporaneously with the received video feed information. This model may be updated as additional information is received from video capture devices 110. In other implementations, the video feed information may be forwarded to virtual event 3D modeling engine 212 upon completion of the live event (e.g., from a production facility, a DVR associated with service provider 115, etc.). In this implementation, virtual event 3D modeling engine 212 may generate the event model based on the complete video feed information for the event. In either case, the generated 3D event model may be forwarded to virtual event server 216 for transmission to requesting users.

Additional information regarding the objects, actors, and participants may be obtained by actor/object data collection engine 214 (block 615). As described above, actor/object data collection engine 214 may retrieve and store information relating to the elements of each virtual event model, such as extrinsic information not included within the video feed information. This information may include, for example, biographical information, team information, subject matter information, etc. The retrieved information may be stored by actor/object data collection engine 214 and associated with a generated model and the model elements included within the model.

Virtual event server 216 may receive a user request to view a virtual event (block 620). For example, a user may interact with virtual event application 420 on STB 246/computer 244 to select a particular virtual event from a listing of available virtual events (e.g., via icons 515 or listings 520 in GUI 500). As described above, in some implementations, the availability of the virtual event may be provided in conjunction with a live event. In other implementations, the listing of available virtual events may be provided via a web interface, an option in an IMG, etc.

In either case, virtual event application 420 may transmit a request to virtual event server 216 for a model corresponding to the selected virtual event. In some implementations, STB 246/computer 244 may interact with virtual event server 216, without initially traversing VSO 230 or VHO 220, such as where the virtual event is requested by user device 250 via network 260 (e.g., the Internet).

Virtual event server 216 may transmit the event model 217 received from/generated by virtual event 3D modeling engine 212 to virtual event application 420 (block 625). In some implementations, the model may be transmitted to virtual event application 420 via VHO 220 and VSO 230. In some implementations, advertising information may be added to the provided model via Ad server 226 on VHO 220.

As described above, in implementations in which the virtual event model 217 is a real-time model being updated with the live event by virtual event 3D modeling engine 212, updated model 217 may be automatically transmitted to virtual event application 420. In instances where the virtual event model 217 has been generated for a completed event, the provided event model 217 is fully transferred to virtual event application at the time of request. As described above, the related information obtained/retrieved by actor/object data collection engine 214 may be provided along with model 217 to virtual event application 240.

Virtual event application 420 may output the virtual representation (e.g., 3D representation 535) of the selected virtual event (block 630). For example, virtual event application 420 may generate GUI 530 of FIG. 5B that includes the virtual representation 535. Virtual event application 420 may receive user commands to navigate within the provided virtual event (block 635). For example, virtual event application 420 may receive user commands to change a virtual camera view, follow a particular object/participant, pause, rewind, or fast forward, etc. In response, virtual event application 420 may output a modified representation 535 based on the received command (block 640).

Virtual event application 420 may receive a user request for additional information relating to a particular event element, object, or participant (block 645). In response, virtual event application 420 may provide the requested information (block 650). In some implementations, virtual event application 420 may provide the requested information from the information obtained by actor/object data collection engine 214. In other implementations, virtual event application 420 may retrieve requested information from third party sources, such as via network 260.

As described above, in some implementations, users may record custom versions of portions of the virtual event for subsequent viewing or sharing with others. The saved event portions may include selected views and a particular timeframe for the virtual event. In some embodiments, users may add custom audio to the saved portion, such as their own play-by-play or commentary. Recording or storing of the custom productions may be facilitated by virtual event application.

Implementations described herein relate to devices, methods, and systems for facilitating the viewing of 3D virtual events generated using multiple captured video feeds. In some implementations, a live event may be captured by a number of video capture devices, from a number of different angles or perspectives. A virtual, 3D representation of the event may be generated based on the captured feeds. In one implementation, the virtual 3D representation may be presented to viewers in a manner that enables the viewers to view the event from any desired vantage point. In addition, users may store customized portions of the virtual event for later viewing or sharing with others. In some implementations, the generated 3D model of the event may be provided to third parties for use in other 3D environments.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, various features have been mainly described above with respect to a data center 210 performing 3D model generation and an STB 246 executing a virtual event application. However, in other implementations, features described herein may be implemented in other devices, such as VHO 220, a mobile production facility, user device 250, etc.

Further, while series of blocks have been described with respect to FIG. 6, the order of the acts associated with the blocks may be varied in other implementations. Moreover, non-dependent acts may be implemented in parallel.

It will also be apparent that various features described above may be implemented in many different forms of software, firmware, and hardware in the implementations illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
    receiving a number of video feeds for a live event from video capture devices located at an event venue, wherein the received number of video feeds include motion capture data from motion capture assisting elements associated with at least one participant in the live event;
    generating a three-dimensional (3D) model of the live event based on the received number of video feeds, wherein generating the 3D model includes extracting the motion capture data from the received number of video feeds;
    receiving, from a user device, a request to view a virtual event corresponding to the live event;
    forwarding the 3D model to the user device;
    outputting, by the user device, a virtual representation of the live event based on the 3D model;
    receiving, by the user device, a user request to manipulate a view within the virtual representation;
    outputting, by the user device, a modified virtual representation of the live event based on the user request;
    receiving, by the user device and from the user, audio content corresponding to at least a portion of the modified virtual representation;
    storing, by the user device, the at least the portion of the modified virtual representation of the live event and the audio content for subsequent outputting, wherein the stored at least the portion of the modified virtual representation depicts a particular point of view within the 3D model based on the user request and the audio content corresponds to the particular point of view; and
    mapping data from the at least the portion of the modified virtual representation of the live event into another 3D virtual environment, wherein thematic appearance or character information is mapped onto one or more of event, object, or participant elements of the virtual event based on input from a user.

2. The computer-implemented method of claim 1, comprising:
    wherein the number of video feeds comprises a number of video feeds from different angles and perspectives relative to the live event.

3. The computer-implemented method of claim 1, further comprising:
    receiving event information relating to the number of video feeds; and
    generating the 3D model of the live event based on received video feeds and the event information, wherein generating the 3D model includes selecting and navigating the 3D model based on the event information.

4. The computer-implemented method of claim 3, wherein the event information comprises information regarding identities of event elements.

5. The computer-implemented method of claim 1, wherein receiving the number of video feeds, generating the 3D model, and forwarding the 3D model are performed:
    in real-time in relation to the live event, or following completion of the live event.

6. The computer-implemented method of claim 1, further comprising:
    obtaining information regarding elements in the 3D model, wherein the elements in the 3D model comprise participants, teams, or objects.

7. The computer-implemented method of claim 1, further comprising:
    inserting advertisement information into the 3D model when forwarding the 3D model to the user device.

8. The computer-implemented method of claim 1, further comprising:
    forwarding the 3D model to a third party for insertion into a virtual environment associated with the third party.

9. The computer-implemented method of claim 1, wherein receiving the request to manipulate a view within the virtual representation comprises receiving a request to position a virtual camera within the virtual representation.

10. The computer-implemented method of claim 1, further comprising:
    receiving, by the user device, a user request to share the stored at least the portion of the modified virtual representation with another user; and
    transmitting, by the user device, the stored at least the portion of the modified virtual representation to the other user based on the request.

11. The computer-implemented method of claim 1, wherein generating the 3D model includes extracting the motion capture data, further comprises:

extracting the motion capture data based on radio frequency identification (RFID) tags associated with event elements.

12. A system comprising:
a service provider device; and
a user device connected to the service provider device via a network,
wherein the service provider device is configured to:
receive a number of video feeds for a live event from video capture devices located at an event venue, wherein the received number of video feeds include motion capture data from motion capture assisting elements associated with at least one participant in the live event;
generate a three-dimensional (3D) model of the live event based on the received number of video feeds, wherein generating the 3D model includes extracting the motion capture data from the received number of video feeds;
receive, from the user device, a request to view a virtual event; and
forward the 3D model to the user device, and
wherein the user device is configured to:
output a virtual representation of the live event based on the 3D model;
receive a request to manipulate a view within the virtual representation;
output a modified virtual representation of the live event based on the request;
receive audio content corresponding to at least a portion of the modified virtual representation;
store the at least the portion of the modified virtual representation of the live event and the audio content for subsequent outputting, wherein the stored at least the portion of the modified virtual representation depicts a particular point of view within the 3D model based on the request and the audio content corresponds to the particular point of view; and
map data from the at least the portion of the modified virtual representation of the live event into another 3D virtual environment, wherein thematic appearance or character information is mapped onto one or more of event, object, or participant elements of the virtual event based on input from a user.

13. The system of claim 12, wherein the number of video feeds comprise a number of video feeds from different angles and perspectives relative to the live event.

14. The system of claim 12, wherein the service provider device is further configured to:
receive identity information regarding an identity of event elements relating to the number of video feeds; and
generate the 3D model of the live event based on received video feeds and the received identity information.

15. The system of claim 12, wherein the service provider device is further configured to:
obtain additional information regarding elements in the 3D model,
wherein the elements in the 3D model comprise participants, teams, or objects.

16. The system of claim 12, wherein the user device is further configured to:
receive a request to position a virtual camera within the virtual representation; and
output the modified virtual representation of the live event based on the request.

17. The system of claim 12, wherein the user device is further configured to:
receive a user request to share the stored at least the portion of the modified virtual representation with another user; and
transmit the stored at least the portion of the modified virtual representation to the other user based on the request.

18. A non-transitory computer-readable medium having stored thereon sequences of instructions which, when executed by at least one processor, cause the at least one processor to:
receive a number of video feeds for a live event from video capture devices located at an event venue, wherein the received number of video feeds include motion capture data from motion capture assisting elements associated with at least one participant in the live event;
generate a three-dimensional (3D) model of the live event based on the received number of video feeds, wherein generating the 3D model includes extracting the motion capture data from the received number of video feeds;
receive, from a user device, a request to view a virtual event corresponding to the live event;
forward the 3D model to the user device;
output a virtual representation of the live event based on the 3D model; and
receive, from a user of the user device, a request to manipulate a view within the virtual representation;
output a modified virtual representation of the live event based on the request;
receive, from the user of the user device, audio commentary corresponding to the modified virtual representation of the live event;
store at least a portion of the modified virtual representation of the live event and the audio commentary corresponding to the modified virtual representation for subsequent viewing, wherein the stored at least the portion of the modified virtual representation depicts a particular point of view within the 3D model based on the request and the audio commentary corresponds to the particular point of view; and
map data from the at least the portion of the modified virtual representation of the live event into another 3D virtual environment, wherein thematic appearance or character information is mapped onto one or more of event, object, or participant elements of the virtual event based on input from a second user.

19. The non-transitory computer-readable medium of claim 18, wherein the instructions further cause the at least one processor to:
receive a user request to share the stored at least the portion of the modified virtual representation with another user; and
transmit the stored at least the portion of the modified virtual representation and the audio commentary corresponding to the modified virtual representation to the other user based on the request.

20. The non-transitory computer-readable medium of claim 18, wherein the instructions further cause the at least one processor to:
receive a request to position a virtual camera within the virtual representation; and
output the modified virtual representation of the live event based on the request.

* * * * *